(12) United States Patent
Dorner et al.

(10) Patent No.: US 10,536,542 B1
(45) Date of Patent: Jan. 14, 2020

(54) DYNAMIC SOCIAL CONTENT EXPLORING SYSTEMS AND METHODS

(71) Applicant: Amazon Technologies, Inc., Seattle, WA (US)

(72) Inventors: Charles Shearer Dorner, Seattle, WA (US); Dustin Boudreau, Shoreline, WA (US); Kenan Hneide, Seattle, WA (US); Stephen Crowley, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 186 days.

(21) Appl. No.: 15/695,504

(22) Filed: Sep. 5, 2017

(51) Int. Cl.
| | |
|---|---|
| *H04L 29/08* | (2006.01) |
| *H04N 21/61* | (2011.01) |
| *H04L 29/06* | (2006.01) |
| *H04L 12/58* | (2006.01) |
| *G06F 16/335* | (2019.01) |
| *G06F 16/735* | (2019.01) |

(52) U.S. Cl.
CPC ............ *H04L 67/22* (2013.01); *G06F 16/337* (2019.01); *G06F 16/735* (2019.01); *H04L 51/04* (2013.01); *H04L 65/403* (2013.01); *H04L 67/306* (2013.01); *H04N 21/6125* (2013.01)

(58) Field of Classification Search
CPC ....... H04L 67/22; H04L 51/04; H04L 65/403; H04L 67/306; G06F 16/337; G06F 16/735; H04N 21/6125
See application file for complete search history.

(56) References Cited

U.S. PATENT DOCUMENTS

| | | | | |
|---|---|---|---|---|
| 2007/0283403 | A1* | 12/2007 | Eklund, II | ............... G09B 5/06 725/117 |
| 2014/0181197 | A1* | 6/2014 | Baggott | ............... H04L 65/403 709/204 |
| 2018/0007431 | A1* | 1/2018 | Sidhu | ............... H04N 21/44222 |

* cited by examiner

*Primary Examiner* — Michael A Keller
(74) *Attorney, Agent, or Firm* — Knobbe, Martens, Olson & Bear, LLP

(57) ABSTRACT

A dynamic content delivery service inserts users into groups based on when they access the service and/or known user interests, and the group provides reactions to videos or other content served to the group. Action rules determine what happens to the group as they interact with the service. For example, based on group reactions at specific time points, some or all users in the group can be switched to a new video or multiple different new videos. User reactions to content can be used to determine where to route the user when action rules indicate they should be redirected.

20 Claims, 6 Drawing Sheets

DYNAMIC SOCIAL CONTENT EXPLORING SYSTEMS AND METHODS

BACKGROUND

Generally described, computing devices and communication networks can be utilized to exchange content and other information. In a common application, a server computing system can provide content to various client computing devices. The content may be textual content, image-based content, videos, animations, some combination thereof, etc. For example, a server computing system can host or provide access to videos that are viewable by client computing devices. A client computing device can transmit a request for a video to the server computing system, and in response the server computing system can transmit or "stream" the requested video to the client computing device. The client computing device can display the video and respond to various playback commands (e.g., pause, rewind, etc.).

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
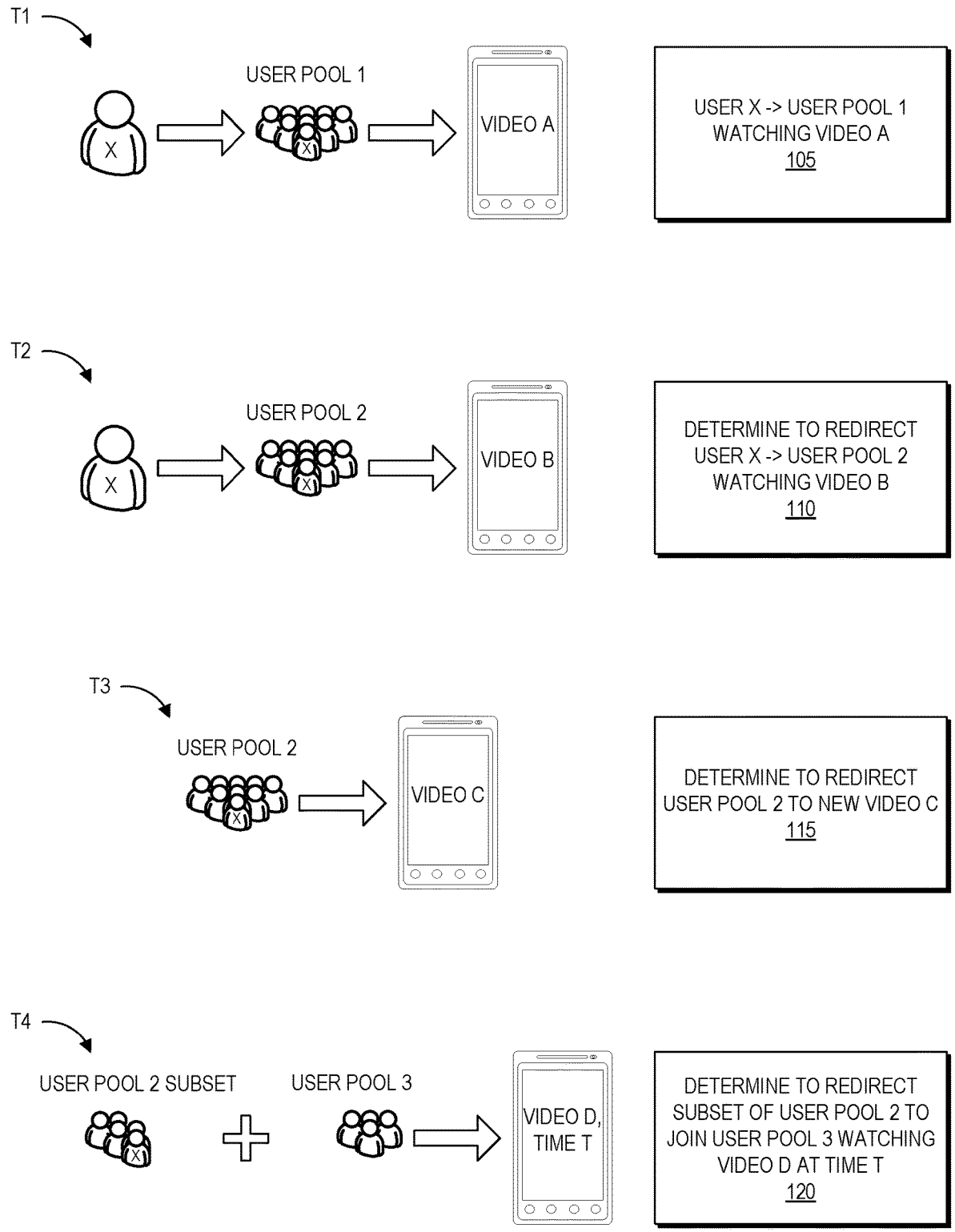
FIG. 1 is a schematic diagram of example events occurring via a dynamic content delivery service.

The present disclosure is generally directed to systems and methods for dynamic and social content delivery. A dynamic content delivery service can insert users into social groups based on factors including when they access the service, known user interests, and known content attributes. As videos or other content are streamed or otherwise served to computing devices utilized by users in the group, users in the group can provide reactions such as comments, emoticons, thumbs up or thumbs down ratings, and the like. The dynamic content delivery service may use action rules to determine what happens to the group and/or various users in the group as they interact with the service. For example, based on individual or group reactions at specific time points, some or all users in the group can be switched to a new group and served a different video. As another example, based on individual or group reactions at specific time points, different users or groupings of users can be switched to different new groups each served different videos. System goals in carrying out the action rules can be to keep as many users together for as long as possible given the action rules, to keep groups of a constant size, and/or other goals, depending on the embodiment. Monitoring user group discussions and user comments, provided for example during video watching, enables the system to perform sentiment analysis to generate attributes for videos, timecodes associated with the attributes, attributes for users, and moods/reactions associated with those attributes.

In some previous content delivery systems, for example digital video streaming systems, users must search or browse to locate videos they wish to view. This can be inefficient if the user does not have a good idea of what they want to watch, sometimes resulting in the user not locating any desired videos. Even where video recommendations are presented in previous systems, such recommendations are typically based on historical behaviors of a given user and thus are not able to account for the user's current mood and preferences. Further, many previous systems lack a social dynamic, as users view content independently of other users, for example by watching a particular video at a later time than other users who have viewed the same video and not synched with other users currently also watching that same video. Even in live streaming services, users may be unable to interact with other users or find any indication of group sentiment relating to the live stream. These factors, alone and in combination, can lead to less desirable user experiences with content serving systems.

The aforementioned problems, among others, are addressed in some embodiments by the disclosed dynamic content delivery service that is configured to direct users into social groups and serve automatically-determined content to these groups based on real-time analysis of user and group reactions to served content. The content can be synchronized such that all users in the group view the same portions of the content at substantially the same time (e.g., within acceptable variations due to network transmission differences and/or varying user device capabilities). The dynamic content delivery service can also be configured to provide a user interface that displays indications of group sentiment regarding served content and facilitates interactions among users. Beneficially, the provided indications of user sentiment can be analyzed in real time (e.g., as a user is viewing a video or other content, or during a current content viewing session of a user), optionally together with known profiles of users and/or content, in order to implement grouping and regrouping logic and to determine what content to serve to user groups. Such a system can advantageously provide a social, content-exploring user experience that solves the aforementioned problems while also facilitating collection of user sentiment data regarding a wide variety of content.

To illustrate, consider the example events depicted by FIG. 1. As illustrated in FIG. 1, at time point T1 user X requests to access the content delivery system and begin a content viewing session, for example by accessing the system over a network via a browser or other application operating on a personal computing device. This can trigger event 105, in which the system groups user X into user pool 1 watching video A. User pool 1 can be selected based on the number of users currently in the pool, identified similarities between user X and the users in pool 1, known profiles of user X and video A that indicate video A may be of interest to user X, the users joining or entering the system within a common timeframe, and/or other factors. As such, in one embodiment user pool 1 may include a number of users who just began their viewing session with the content delivery system. If user X joins after user pool 1 has started watching video A, user X can "jump in" to the video at the currently-viewed time point of video A. The system can facilitate interactions between users, for example via a general user pool 1 discussion board, user-created chat groups with other users in user pool 1, and/or private messaging between users. The system can also facilitate interactions between users and the content, for example by providing a selection of emoticons or other reaction indicators that users can select at different time points during playback of video A via selectable options presented within a user interface. The system may reveal these reactions to the user pool via a video timeline, reaction graph(s), textual reaction summary, and/or other visual or audio presentation, such that users in user pool 1 can identify the reactions and/or sentiments of other users in their group with respect to video A.

At time point T2, user X can provide a reaction to video A and/or user pool 1 indicating that user X is not enjoying video A and/or being in user pool 1. For example, user X can cause display of a negative (e.g., sad, angry, confused, awkward, etc.) emoticon or other emotional reaction indicator on the timeline of video A that is displayed to other users of the group, such as by selecting a corresponding graphical indicator within a user interface. As another example, user X can provide a textual comment in a user discussion group that expresses negative sentiment, e.g. "I feel like I don't like the same things as this group." The content delivery system can detect this reaction in real time, triggering action 110, where the system determines to redirect user X into user pool 2 that is watching video B. The particular reaction provided by user X can assist the system in identifying one or both of user pool 2 or video B as a better fit for user X (or for the current mood or preferences of user X). User X may be provided with a confirm or deny prompt prior to the redirection that allows the user to choose whether to be redirected, and the prompt may or may not identify to user X that they are selected for joining user pool 2 and/or watching video B. In some embodiments, user X may be redirected into user pool 2 to replace another user who has left user pool 2 and/or to meet a system goal of assigning a particular number of users to a group. Again, if user X joins after user pool 2 has started watching video B, user X can "jump in" to the video at the currently-viewed time point of video B, such that user X and the other users of user pool 2 view video B substantially in synchronization with each other without the addition of user X to the group affecting playback of the video for the previous members of the group.

At time point T3, aggregate reactions of user pool 2 can indicate that video B is not a good fit for the group (e.g., reactions from greater than a threshold number or percentage of users indicate that user pool 2 agrees that watching video B is not positive or enjoyable). Accordingly, at time point T3 the system can trigger action 115 in which the system determines to redirect user pool 2 to a new video C. Alternatively, at time point T3 video B may reach its end, and the system can determine that user pool 2 should remain together for a next video, for example based on agreeance of reactions provided by users in pool 2 to video B, chat discussions between the users in pool 2, and/or other considerations. In this example, time point T3 can trigger action 115 in which the system determines to redirect user pool 2 to video C, where video C may be another video in the same channel as video B or that shares common characteristics with video B based on a determination that the users in pool 2 generally liked video B. Alternatively, if the users in pool 2 generally disliked video B, the system may select video C such that video C has substantially different characteristics than video B.

At time point T4 the system can determine to redirect a portion of user pool 2. For example, a first subset of the users may be in agreeance about the positive or negative attributes of video C while a second subset disagrees with the first subset but agrees with each other. As another example, the first subset of the users may be engaged in a discussion with one another while the second subset of the users are engaged in a separate discussion. As another example, the system can determine that the first subset of users share a common current mood while the second subset share a different common current mood. These are just a few examples of user experiences that can trigger the system to split off a portion of a user pool. This can trigger action 120 in which the system determines to combine the user pool 2 subset with user pool 3 that is currently being served video D at time T. As such, the subset of user pool 2 can jump in to video D at time T.

The foregoing are provided as just a few non-limiting examples to introduce the disclosed dynamic content delivery system by illustrating a number of potential actions and user experiences within such a system. Further examples and system features are described in more detail below.

As will be appreciated, reactions that are "negative" or "positive" can vary from user to user, and can also vary from time to time for each user. For example, some users may consider awkward content to be enjoyable and funny, while other users may find awkward content difficult or unpleasant to watch. For the former, an "awkward" reaction may indicate positive sentiment while for the latter, an "awkward" reaction may indicate negative sentiment. To address this potential ambiguity, embodiments of the disclosed dynamic content delivery system can generate and/or store individual or user-segment level profiles. Each user profile can associate particular reactions provided by the user or user segment with positive or negative sentiment indications (e.g., binary positive/negative, positive/negative/neutral, or values along a spectrum of positive to negative), and the system can use such profiles to classify a particular reaction provided by a particular user as positive, negative, or somewhere in between. Further, for a given user, a reaction of "sad" may typically be considered as indicating negative sentiment, while after occurrence of a sad life event the user may desire to view sad content. Accordingly, embodiments of the disclosed dynamic content delivery system can generate and/or store mood profiles. Each mood profile can relate to a different one of a number of moods, and can associate particular reactions with positive or negative sentiment indications for users experiencing that mood. The system can use user mood profiles in combination with real-time determinations of user moods to classify a particular reaction provided by a particular user as positive, negative, or somewhere in between.

Although aspects of some embodiments described in the disclosure will focus, for the purpose of illustration, on particular examples of content, items, and interactions, the examples are illustrative only and are not intended to be limiting. In some embodiments, the techniques described herein may be applied to additional or alternative content, algorithms, etc. For example, the content to which user groups are directed may be image content (e.g., pictures, drawings, etc.), audio content (e.g., audio books, podcasts, music, etc.), textual content (e.g., electronic books or "e-books"), or the like. As another example, the recommendations provided to viewers/listeners/users may not be information about a specific item identified in the content, but may instead or additionally be information regarding a related item, alternative item, etc. Various aspects of the disclosure will now be described with regard to certain examples and embodiments, which are intended to illustrate but not limit the disclosure.

Overview of Example Dynamic Content Delivery Service

Figure 2:
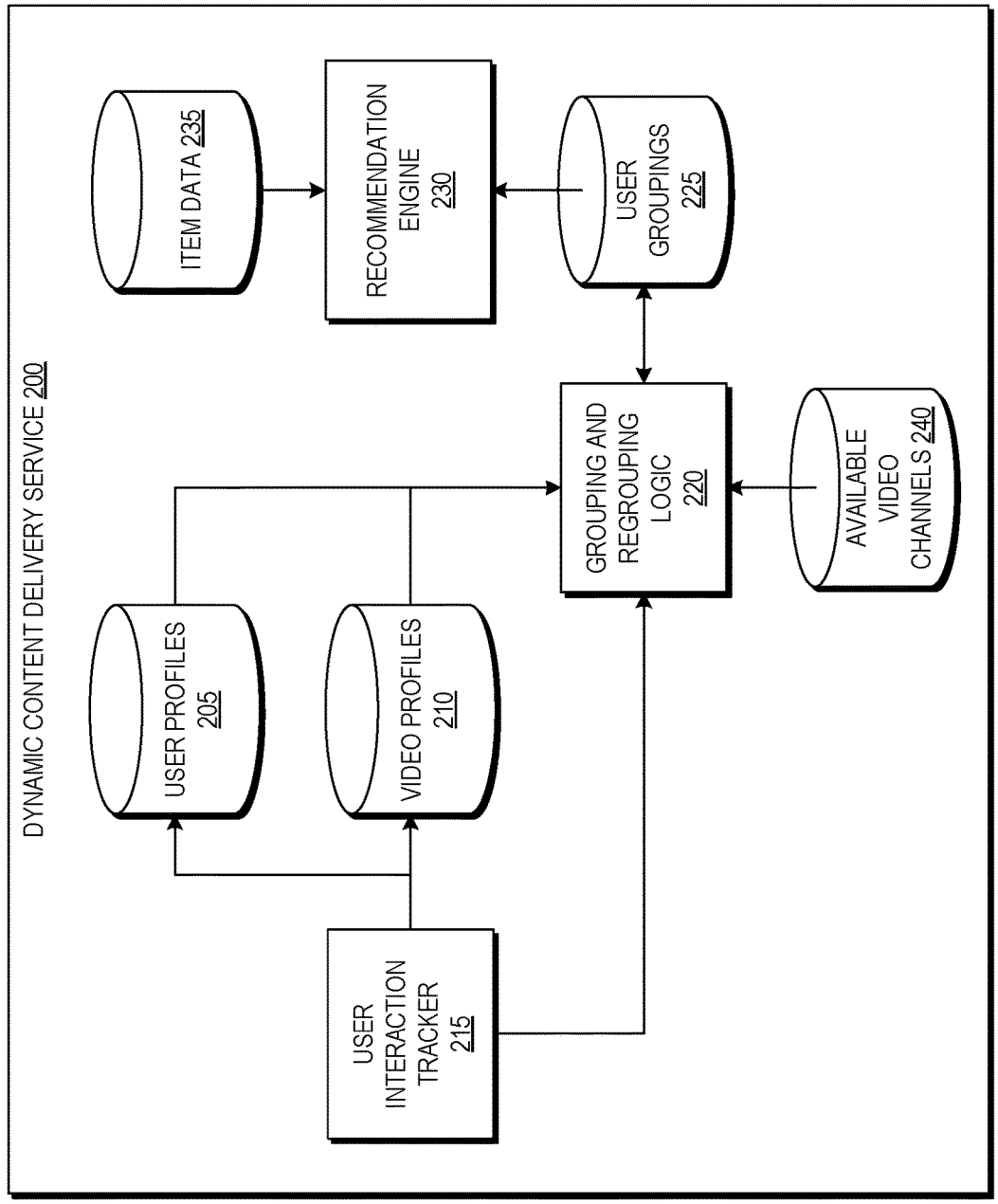
FIG. 2 is a schematic diagram of illustrative components and data flow within a dynamic content delivery service according to some embodiments.

With reference to an illustrative embodiment, FIG. 2 shows a schematic diagram of illustrative components and data flow within a dynamic content delivery service 200. The dynamic content delivery service 200 includes user profiles data repository 205, video profiles data repository 210, available video channels data repository 240, user groupings data repository 225, and optionally item data repository 235. These data repositories can each include one or more hardware electronic storage devices and one or more database architectures for storing the data described below. The dynamic content delivery service 200 also includes a number of modules including user interaction tracker 215, grouping and regrouping logic 220, and optionally recommendation engine 230. These modules can each include one or more programming modules executed by one or more processors.

The user profiles data repository 205 stores profiles of users, with such profiles including interaction history of the user, attributes of the user, and/or user segments to which the user is assigned. For example, the user profile data of a particular user can include a unique identifier of that user (e.g., a user ID number). The user profile data of that user can also include a sequential history of interactions performed by that user. Each interaction can include a code corresponding to a content viewing event (e.g., a serial number of a video or other content identifier), a time stamp of the time of the interaction, and additional data representing a reaction timeline of the user while viewing the content and/or keywords or textual responses submitted by the user. In some embodiments, user interactions with other systems (e.g., an electronic catalog system, social media systems, network browsing systems, and the like) can be included in the sequential history or in additional event histories that are stored in association with the user's unique identifier. The historical reaction data of a user can be used to identify attributes of the user, for example preferences such as data indicating that the user doesn't like horror content, but likes awkward content, or past moods of the user. A recent subset of the historical reactions (e.g., within the current session) may be used to identify the current mood of the user, and a sequence of recent reactions can be used as a user attribute in some embodiments. The user profile data of that user can also include unique identifiers of other types of attributes of that user, for example age band, gender, or other demographic information. As used herein, attribute can refer to the historical reactions of the user, information gleaned from a behavioral history of the user, demographic information of the user, or any combination thereof. The user profile data of that user can also include unique identifiers of any user segments to which the user has been assigned. User segments may include clusters of users that share common attributes and can be used for making general predictions about user preferences in the absence of, or supplementary to, specific interaction histories of a given user in the segment. As such, the user profiles data repository 205 can also include some or all of the above types of data stored in association with a unique user segment identifier.

The video profiles data repository 205 stores profiles of videos, with such profiles including interaction histories of users who have viewed a video, attributes of the video, and/or user categories to which the video is assigned. Videos can be pre-generated or live streams. For example, the video profile data of a particular video can include a unique identifier of that video (e.g., a serial number or video ID number). The video profile data of that video can also include a number of different response timelines logging responses by different users to the video. Each timeline can include a unique identifier of the user, a code corresponding to a response (e.g., an identifier of a particular emoticon, comment, or other response provided by the user), and a time stamp of each response. Such responses may be analyzed in aggregate to generate a more general aggregate response timeline representing average or typical user responses to the different time points of the video. Attributes of videos can relate to the type of content in the video (e.g., cats, cooking, do-it-yourself instructions) and a number of attribute identifiers can be stored in association with each video. Example categories include horror, sci-fi, romantic comedy, live stream, gaming, instructional, and the like, and a given video can be assigned to one or more categories.

Though discussed in the context of videos, it will be appreciated that video profiles data repository 205 can be configured to store data representing other types of electronic content such as images, audio files, electronic books, and the like, depending upon the type of content served by the dynamic content delivery service 200.

User interaction tracker 215 may be configured to identify and log user interactions with content of the dynamic content delivery service 200. For example, user interaction tracker 215 can generate the response timelines described above based on logged responses provided by users to certain videos. User interaction tracker 215 can also log which users watch which videos and for how long, and can log replays, skips, and other user-video interactions. Some embodiments of the user interaction tracker 215 can also be configured to analyze the tracked data to populate attributes into user and/or video profiles, to assign users to segments, to generate aggregate response timelines for videos, and/or to assign videos to categories.

User interaction tracker 215 can glean a lot about videos served via system 200, for example by mining text from user chat groups or messages and logging user reactions at certain timecodes. User interaction tracker 215 can correlate negative sentiment statements (e.g., a textual comment of "ugh, boring") with thumbs down reactions (or negative emoticons) that happen around those same times. User interaction tracker 215 can correlate positive sentiment statements (e.g., a textual comment of "I love this brand!") with thumbs up reactions that happen around those same times. This enables the system 200 to generate attributes for videos as well as timecodes associated with those attributes.

Available video channels data repository 240 stores identifiers of any pre-generated videos that are available for user viewing as well as any live streams that are currently being conducted. These videos and live streams can be grouped into a number of channels, for example based on videos in a channel sharing common attributes, categories, and/or aggregate user response timelines. Beneficially, creating channels of videos can enable the system to match a group of users with a particular channel and, once it is determined based on user responses that the group and channel are a good fit, to easily redirect the group through a sequence of different videos likely to elicit positive reactions from users of the group.

User groupings data repository 225 is a dynamic data repository storing the current (and optionally past) groupings of users. These groupings can optionally be stored with identifiers of current (and optionally past) videos viewed by a particular group.

Grouping and regrouping logic 220 is configured to monitor the users currently using the system, the logged interactions of these users with current (and optionally past) videos and/or discussions with other users, and the available video channels in data repository 240. Grouping and regrouping logic 220 is further configured to group users into groups with other users based on detected user and/or group video reactions, user and video profiles, and predetermined action rules. Grouping and regrouping logic 220 is further configured to assign a user group to a channel (or a specific video).

For example, when new users are joining (e.g., beginning a session with) the dynamic content delivery service 200, the grouping and regrouping logic 220 can determine how to group the new users with each other and/or existing groups. If users are joining at a rapid rate, the grouping and regrouping logic 220 can group them based on time (for example, all users who join within the same interval, e.g. one minute) or group size (e.g., the next 200 people). In one embodiment, the users in these groups all watch the same video content together, and are connected socially via a chat room, discussion board, or other type of messaging service.

Once users are watching a video, the grouping and regrouping logic 220 can begin a cycle of monitoring user reactions for triggers and performing redirecting actions upon detecting such triggers. Redirecting actions can include redirecting a particular user to a new group and/or new content, redirecting a portion of a group to a new group and/or new content, merging or splitting user groups, and redirecting an entire group to new content, to name a few examples. The trigger can be identified based on thresholds, for example individual user thresholds (e.g., determining a negative reaction of a threshold level, or determining that a threshold amount of time has passed with no user reactions) or group thresholds (e.g., determining a threshold number or percentage of users provided negative reactions, or determining that a threshold amount of time has passed with no group reactions). For example, a threshold may be a time period (such as 1 minute), some position in the video timeline (such as the end of the video), a percentage of users who have voted thumbs down (such as 50% or more), a ratio of thumbs down to thumbs up (such as 1.5:1), or some combination thereof (using either logic AND or logic OR). When a trigger is detected (for example, a group watching 1 minute of a video AND 50% thumbs down), an action is taken (for example, redirect the group to a new video).

Grouping and regrouping logic 220 can be set such that only a subset of the users in a group are affected by the action (e.g., only those who reacted with thumbs down jump to a new video). Grouping and regrouping logic 220 can be set such that all users are affected by the action but are redirected to a different places (e.g., those who reacted with thumbs up go someplace else than those who reacted with thumbs down). One goal of the system, provided to grouping and regrouping logic 220, can be to try to keep as many users together as possible. An alternative goal might be to constantly ensure (as best as is possible) that groups are maintained at a given size (for example, 100 users per group). In this case, grouping and regrouping logic 220 can use a more specific recommendation algorithm to group users into multiple pools of specific sizes and intended video channel destinations (e.g. 100 people broken into: a group of 60 staying on the current video, a group of 30 jumping to a video on a new video game that currently has 70 people watching, and a group of 10 jumping to a painting livestream with 90 people watching). Grouping and regrouping logic 220 can be set in some embodiments to aim for a minimum group size.

The reactions provided by users, e.g. thumbs up and thumbs down, can be used by grouping and regrouping logic 220 to identify content to serve to a user or user group, such that the grouping and regrouping logic 220 tries to get the user/group to content they wish to see and that will elicit positive reactions. Alternatively, the grouping and regrouping logic 220 can use reactions provided by users to try to keep a user with a group of users with similar reactions. Thus, in some embodiments the grouping and regrouping logic 220 can be configured to group users socially based on programmatically-identified similarities between the users to try to create groupings of like-minded users, rather than grouping based on users' social networks of pre-known friends or acquaintances. These can be combined into a system goal of having a group of people watching a set of videos (e.g., videos in a channel) together that they all enjoy (e.g., exhibit positive reactions).

With a fast time cycle (e.g., 10 seconds-1 minute being a threshold for identifying new triggers), the service 200 can obtain a lot of data regarding what a user is enjoying or not enjoying. A "fast" cycle time may vary based on number of users in a group, for example using a threshold of less than one second for a group having a single user and using a threshold of 10 seconds for a group with 100 users. Cycle time can also be determined based on historical reaction data indicating how long it typically takes to get a reaction from a particular user or group of users, or for a particular video or category of video. The data representing what the user is enjoying may be only momentarily or short-term relevant (mood based) or medium-term relevant (a user is interested in pregnancy right now and for a limited time period) or long-term relevant (a user has a long-term love of woodworking). To deal with this, grouping and regrouping logic 220 can use a decay method around content automatically selected to serve to users so that information is quickly leveraged. For example, grouping and regrouping logic 220 can use a logarithmic function against time elapsed since a user's reaction to apply that data point to the user's identified content. To incorporate a medium or long term interest, grouping and regrouping logic 220 can leverage a clustering model of the videos (or attributes of those videos) to determine when a user reaction is similar in nature to a past user reaction. For example, if user A likes or exhibits positive reactions to videos on gardening repeatedly or over a long time period, then positive reactions to gardening provided in the more distance past could retain a higher value instead of the logarithmic value. For example, grouping and regrouping logic 220 can multiply the value of a reaction if it is observed multiple times over time.

Because grouping and regrouping logic 220 may use real-time reaction analysis to group similar users together and find suitable content for such groups, in around 5-12 videos in some embodiments the grouping and regrouping logic 220 can have a high confidence that it is selecting suitably similar user groups as well as interesting content for these groups. This can factor in the current moods of the users, as the grouping and regrouping logic 220 uses real-time reaction analysis and thus bases decisions on current signals indicating what a user likes or does not like. As such, grouping and regrouping logic 220 is able to provide fast, personalized, and currently-relevant recommendations to users.

In certain scenarios, grouping and regrouping logic 220 can determine to jump people into a specific timecode of a video. This can be an identified timecode where user reactions start to increase or peak, and may be done to prompt quick provision of reactions, for example for a new user or early in a session of a user (or user group). As another example, if the first 10 seconds of a video has received lots of thumbs down, but user interaction tracker 215 identifies a big spike in thumbs up starting at 10 seconds, grouping and regrouping logic 220 can jump people in to that video at the 10 second mark. This can also factor in whether the users who previously provided the thumbs up and thumbs down reactions are similar to the instant user or group. Accordingly, grouping and regrouping logic can implement similarity measures when determining current actions based on past user reactions. Similarly, grouping and regrouping logic 220 can jump a user or group of users out of a video at a specific time code based on historical reaction data. Grouping and regrouping logic 220 can also personalize time-code jumping, where one group might jump in at 10 seconds, but then a second group jumps in to join them at 90 seconds. The grouping and regrouping logic 220 can thus use a combination of video-attribute based selection and timecode-based selection.

There are a number of ways that grouping and regrouping logic 220 can jump users into a video to provide synchronous playback to a group of users, for example by (1) jumping all users in together at the beginning of the video, (2) jumping one or more users in at a current playback timecode of another group of users already watching the video, or (3) jumping users in to an identified timecode of interest, even if no other users are currently watching the video. Grouping and regrouping logic 220 can implement cross-group timing synchronization for keeping a minimum number of people together. For example, the grouping and regrouping logic 220 can serve two different videos to two different groups, where such videos start and end at the same time. Further, channels may be synchronized so that the sequence of videos in a first channel has the same start and end time codes as the sequence of videos in a second channel. Grouping and regrouping logic may accomplish this by ordering videos of the same length in the same positions in both channels, or may use filler content to achieve this cross-channel synchronization if needed. This can allow grouping and regrouping logic 220 to merge groups, for example groups from which users have left the service 200, without interrupting the video playback of either group. In other embodiments, one group may be jumped out of the longer video at the same time as the shorter video ends in order to merge the two groups, or the group that concludes watching the shorter video may be served additional content (for example, a short clip of a similar length as the time remaining in the longer video) before the groups are merged.

In some embodiments, two or more users may be able to jointly specify to the system 200 that they wish to remain in a group together, for example via a first user sending a "stay together" invitation to a second user and the second user selecting an option to accept the invitation. In some embodiments, a user may be able to unilaterally specify that they wish to avoid being grouped with another user, for example another user who has offended them via a discussion group comment. In such embodiments, the grouping and regrouping logic 220 can incorporate rules for following user-specified grouping preferences if all such users are currently participating in the service 200. Grouping and regrouping logic 220 can also incorporate other rules that enable users to exercise some control over their redirection through the service 200, for example by providing user-selectable "leave video" options, by showing users when other users in the group leave a video, and by presenting user-selectable options for the remaining users to join the users who have left.

As described, the service 200 can also include a module for facilitating, displaying, and logging chats between user groups. The described chats or discussion comments may be ephemeral, that is, they may be visible to a user or user group while watching the video to which the comments pertain but may be inaccessible after the video concludes. In other embodiments, the described discussions may be persistent, that is they may be accessible by a user or group of users after the video to which the comments pertain has concluded. In such embodiments, each user may be able to see some or all past comments on a video. Alternatively, as the comments relate to a social setting, users may be able to see only comments on videos that were made by other users in the same group as the user (at the time the comments were made). In this example, each user may retain a history of group chats involving the user, such that the chat history of each user is unique based on the groups to which that user has been assigned and the comments made while the user was in each group. User participation in such discussions can be anonymous, or can identify users by name or code name, or a combination thereof as specified by individual user preferences.

In some embodiments, if a certain group of users is not providing above a threshold number or frequency of comments and/or reactions on a particular video, the dynamic content delivery service 200 may introduce historical comments and/or reactions to prompt socialization. These historical reactions can be shown to the group at the same time codes at which they were originally provided. The socialization aspect of the disclosed service 200 can enhance user enjoyment of the served content and also provides data that can be leveraged to programmatically identify features of the content, potentially with greater accuracy than analysis of video frames or audio waveforms alone. In some embodiments, the user reactions can be analyzed together with video frames and/or audio waveforms to build a more complete understanding of the attributes of a video.

A user may find content they wish to continue watching as they are redirected through the system. In some embodiments, the service 200 can present a user-selectable option to leave the social grouping and redirection cycle and transition into a different mode of watching content individually and/or manually exploring the available content. Some embodiments of this mode may allow users to choose their own groups that will not be regrouped, and such groups can select their own content for viewing as a group.

Optionally, the dynamic content delivery service 200 includes item data repository 235 and recommendation engine 230. Item data repository 235 can include data representing a plurality of items (e.g., physical goods, digital goods, or services) available for acquisition (e.g., purchase, rental, streaming, etc.) by users of an electronic catalog. Item data repository can store a unique identifier of each item (e.g., a product ID or serial number) together with data representing the item (e.g., pictures, title, description, attributes, ratings, user reviews, price, etc.). Recommendation engine 230 can be configured to identify which items may be of interest to particular users and to present users with a recommendation user interface including information about the items and user-selectable options to purchase, obtain, or otherwise gain access to the items.

For example, some items in the electronic catalog may be featured or depicted in videos that are served by the dynamic content delivery service 200. Such items may be identified through automated image analysis of video frames, by users watching the video, or by users who submit the video to the service 200. Illustratively, related items may be determined using the recommendation engine 230, where related items are similar to or substitutes for the actual items in a video.

The related items may be presented as recommendations in addition to or alternatively to the actual items in the video. Related items may include items that are related to items identified in a video, items in other videos that are related to the video, etc. In some examples, related items can be presented to users instead of the depicted items if the depicted items are unavailable in the electronic catalog. As another example, a video may be a trailer or clip from a longer movie, and the recommendation engine 230 can identify the full movie as a recommended item.

Beneficially, in some scenarios a user in a chat group may have an item that is recommended during playback of a video. This user can discuss the item with other users in the chat group, presenting an opportunity for real-time reviews and conversations about the recommended item.

The recommendation engine 230 can provide its recommendations during video playback, or independently of video playback. For example, a presentation of items that a user may be interested in based on the viewer having viewed the video may be provided to the user after the video has finished, or through a separate communication to the viewer. The recommendation engine 230 in some embodiments can provide an unobtrusive, user-selectable icon on a video-watching user interface that, when selected by a user, reveals the recommended items. In some embodiments, recommendation engine 230 can display the recommended items in a user chat group, for example at times corresponding to time codes associated with the recommended items, or at the instruction of a user who is providing the video (e.g., a live streaming user).

Overview of Example Dynamic Content Delivery Process

Figure 3:
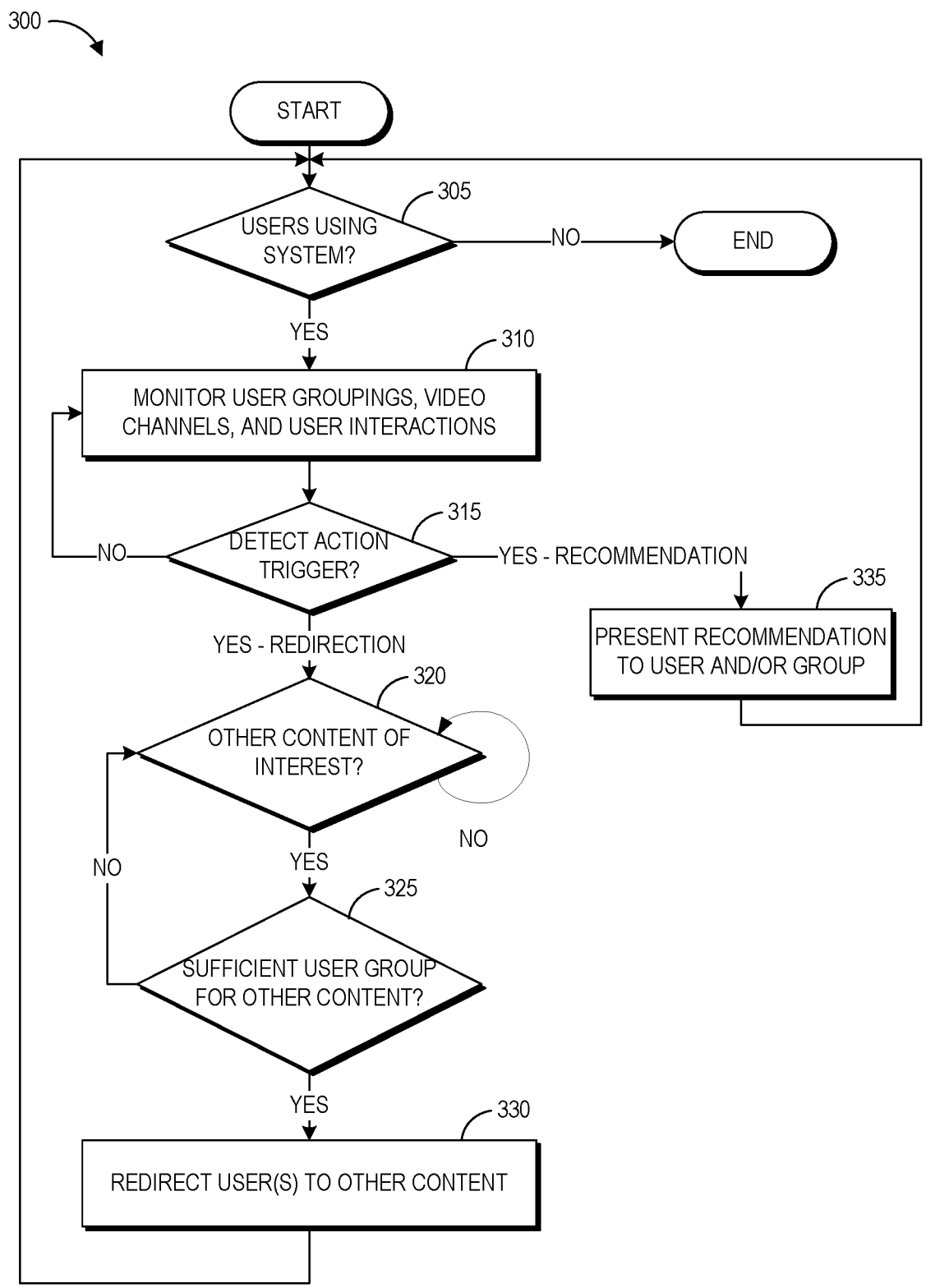
FIG. 3 is a flow diagram of an illustrative process for providing the dynamic content delivery service of FIG. 2 according to some embodiments.

FIG. 3 is a flow diagram of an illustrative process 300 for providing a dynamic content delivery service as described herein. The process 300 can be performed by the illustrative dynamic content delivery service 200 of FIG. 2 or another suitable service.

The process 300 may begin in response to an event, such as on a predetermined or dynamically determined schedule, on demand when initiated by a system administer, or in response to some other event. When the process 300 is initiated, a set of executable program instructions stored on one or more non-transitory computer-readable media (e.g., hard drive, flash memory, removable media, etc.) may be loaded into memory (e.g., random access memory or "RAM") of a server or other computing device of the dynamic content delivery service 200. The executable instructions may then be executed by a hardware-based computer processor (e.g., a central processing unit or "CPU") of the computing device. In some embodiments, the process 300 or portions thereof may be implemented on multiple computing devices and/or multiple processors, serially or in parallel.

At block 305, the grouping and regrouping logic 220 or some other module or component of the dynamic content delivery service 200 determines if there are currently users using the dynamic content delivery service 200. If not, the process 300 ends, and may be re-initiated after a predetermined period of time or after detection of a user accessing the service 200.

If there is at least one user presently accessing service 200, the process 300 transitions to block 310. At block 310, the grouping and regrouping logic 220 or some other module or component of the dynamic content delivery service 200 monitors user groupings, video channels, and user interactions with one another and with videos. As described above, grouping and regrouping logic 220 can be configured with action rules that specify what interactions amount to triggers and dictate what actions occur in response to detecting a trigger.

At block 315, the grouping and regrouping logic 220 or some other module or component of the dynamic content delivery service 200 determines whether an action trigger has been detected. As described above, the trigger can be specified by the rules provided to the grouping and regrouping logic, and can be determined based on real-time analysis of user reactions to the content that is served to them via the service 200.

If, at block 315, the grouping and regrouping logic 220 or some other module or component of the dynamic content delivery service 200 detects a recommendation trigger, the process 300 moves to block 335. For example, a recommendation trigger can be the nearing or passing of a time code associated with a recommended item, a user selecting an option to view recommendations, a user concluding watching a video, and the like. At block 335, the recommendation engine 230 or some other module or component of the dynamic content delivery service 200 presents the identified recommendation to the user or user group watching the video. The process 300 then loops back to block 305.

If, at block 315, the grouping and regrouping logic 220 or some other module or component of the dynamic content delivery service 200 detects a redirection trigger, the process 300 moves to block 320. For example, a redirection trigger can be a reached threshold indicating that a user, group of users, or portion of a group of users is reacting negatively to a video. The threshold can be time-based, response-based, or a combination as described above.

At block 320, the grouping and regrouping logic 220 or some other module or component of the dynamic content delivery service 200 determines whether there is other content of interest to the user or grouping of users associated with the redirection trigger. The content considered at this block can be video channels, or can be individual videos. If no content of interest is identified, the grouping and regrouping logic 220 can loop through block 320 to identify some content that may be of interest (or of more interest than the current content) to the user or group, for example using different matching criteria or interest-level thresholds.

Once the grouping and regrouping logic 220 or some other module or component of the dynamic content delivery service 200 identifies predicted content of interest, the process 300 moves to block 325. At block 325, the grouping and regrouping logic 220 or some other module or component of the dynamic content delivery service 200 determines whether there is a sufficient user group size to send the user or group to the other content. As described above, the grouping and regrouping logic 220 can be configured to maintain minimum, maximum, or set group sizes. Accordingly, at block 325 the grouping and regrouping logic 220 determines whether the group that would be redirected to the identified content of interest satisfies its configured group size rules. If not, the process 300 loops back to block 320 and the grouping and regrouping logic 220 identifies other content of interest. On subsequent iterations through block 320 as a result of the potential repeated loop between blocks 320 and 325, additional users may be considered by the system for potential redirection to the content of interest. These additional users may be identified in association with, for example, a second action trigger (potentially identified by another instance of method 300 executing in parallel) adding additional users to a pool of users to be redirected together.

Once the grouping and regrouping logic 220 has identified content of interest and a sufficient group size to which the content will be served, the process 300 moves to block 330. At block 330, the grouping and regrouping logic 220 or some other module or component of the dynamic content delivery service 200 redirects the user or users to the identified content. As described above, this can involve redirecting a single user, an entire group of users, a portion of a group of users, and merging a group or group portion with another group or group portion. After completing the redirection, the process 300 loops back to block 305.

Overview of Example User Interface

Figure 4A:
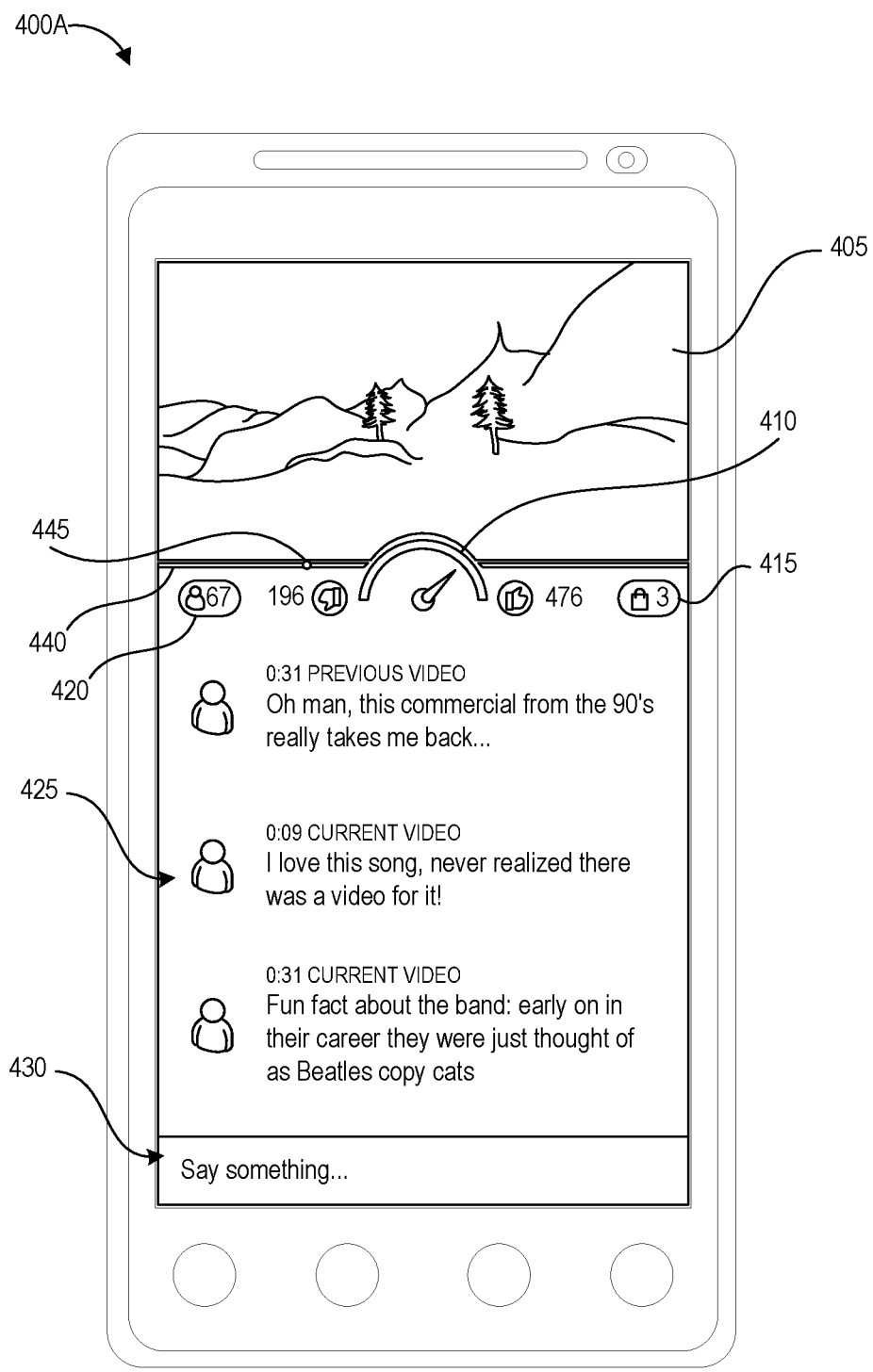
FIGS. 4A and 4B depict illustrative user interfaces of an application providing user access to the dynamic content delivery service of FIG. 2.

FIG. 4A is a pictorial diagram of an illustrative user interface 400A of an application that provides user access to the dynamic content delivery system 200. As shown, a video item is displayed in a video pane 405 of the user interface 400A. The user interface 400A also includes a group reaction indicator 410, video timeline 440, indication 420 of the number of users in the group, user-selectable recommendations icon 415, a chat history 425, and an input text box 430. The particular arrangement of these features can be varied according to the desired user interface layout and/or screen sizes of different users devices, and features can be added, removed, or modified in other examples and to present other types of digital content.

The appearance of the video timeline 440 can be updated dynamically as the current time point 445 progresses through the duration of the video. In some embodiments, the video timeline 440 can additionally be displayed with graphical representations of user reactions provided at specific time points. In some embodiments, a timeline of the video may be accessed (e.g., using the interface 400A or a similar interface) during video playback, after video playback, or independently of video playback. The timeline may provide indications of user reaction to time points, scenes, or windows of time in the video, with such responses being from the viewing user and/or other viewing users in the current group of the user. Such reactions can include textual comments, emoticons, thumbs up or down icons, or other graphical icons indicating sentiment provided by a user regarding the video.

The group reaction indicator 410 includes user-selectable icons that enable a user to provide thumbs down or thumbs up reactions to the current video. The group reaction indicator 410 also includes a meter showing the aggregate sentiment of the current user group to the displayed video, as well as the number of users historically who have given the video thumbs up or thumbs down. In other embodiments, the group reaction indicator 410 can be limited to only depicting reactions of the current user group to the video. Other suitable graphical depictions of group reactions and other reaction inputs can be used in other embodiments.

The indication 420 of the number of users in the group may be dynamically updated as users are redirected out of or into the group. In some embodiments, the indication 420 can be a user-selectable element that, when selected, causes output of a list of the users currently in the group. Through this list, the user of the interface 400A may be able to interact with specific other users, for example by sending follow requests or providing "avoid" indications. In some embodiments, the list of group users can be positioned to not obscure the continued playback of the video.

The user-selectable recommendations icon 415 includes an indication of a number of recommended items that are associated with the current video. Selection of this icon 415 can cause output of a recommendations user interface to the user. In some embodiments, the recommendations user interface can be positioned to not obscure the continued playback of the video. Some embodiments can omit the icon 415, for example if a user has recommendations disabled, if there are no recommendations for a particular video, or if the system is configured to not present recommendations.

The chat history 425 can include a dynamic scrolling history of comments as illustrated, where older comments move upward and out of the viewport as newer comments are posted. As described above, each user in the group can see a common chat history 425, or the chat history 425 may vary from user to user based on the groups to which they have been assigned and the chats that occurred while they were assigned to each group. The chat history 425 may be displayed ephemerally only during the current video, or may persist after a user is redirected to another video. Even in embodiments where chat histories are displayed ephemerally, the service 200 may retain a logged chat history, for example for use in mining attributes of videos and/or users. The input text box 430 enables a user to provide their own comments to the chat history 425.

Figure 4B:
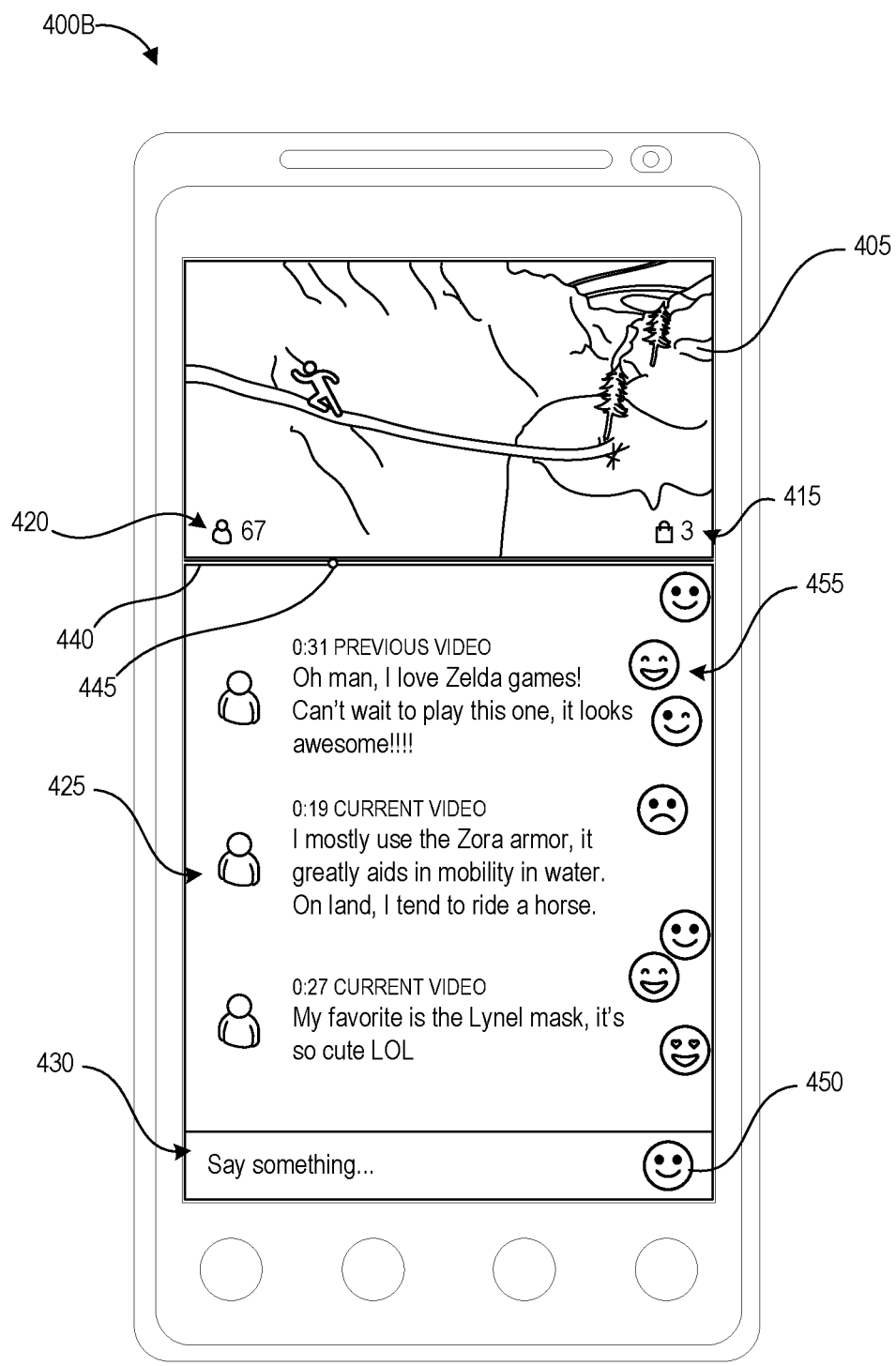

FIG. 4B is a pictorial diagram of another illustrative user interface 400A of an application that provides user access to the dynamic content delivery system 200. Similar to the user interface 400A, user interface 400B also includes a video pane 405, video timeline 440 and current time indicator 445, indication 420 of the number of users in the group, user-selectable recommendations icon 415, a chat history 425, and an input text box 430. In this example, a video item of a video game is displayed in a video pane 405 of the user interface 400B, for example a trailer for the game, a live stream of someone playing the game, or a pre-recorded video of gameplay. The particular arrangement of these features can be varied according to the desired user interface layout and/or screen sizes of different users devices, and features can be added, removed, or modified in other examples and to present other types of digital content.

The user interface 400B also includes a user-selectable emoticon submission icon 450 that can expand a menu of available emoticons or change emoticon based for example on number or duration of "clicks" or screen taps. This can allow the user to submit any of a predefined set of emoticons to show emotional reaction to the video. In some embodiments, analysis of previously submitted emoticons for the video and/or previously submitted comments can be used to determine which set of emoticons to display for the video.

The user interface 400B also includes an emoticon reaction timeline 455. In the illustrated example, the emoticons submitted by users in the group are shown along the right-hand side of the user interface 400B. When a user submits an emoticon using the user-selectable emoticon submission icon 450, the selected emoticon may appear to emerge from the user-selectable emoticon submission icon 450 and float upwards into the chat history area 425. As time passes, the emoticons can continue to appear to float upwards towards the video pane 405, optionally with some horizontal movement across a right-hand region of the user interface 400B as well. Optionally, as the emoticons approach the video pane 405, they may gradually fade until they disappear. The timeline 455 can display, to all users in a group, emoticons submitted by any other users in that group and/or historical emoticons introduced in low-interaction contexts as described above. Other example user interfaces can implement variations on the example illustrated timeline 455, for example placing the emoticons at the corresponding timecodes on the video timeline 440 or as a separate timeline below timeline 440.

Via user interfaces 400A, 400B or variations thereof, users can socially experience the video item by seeing the reactions of other users to the video or to different portions of the video, and can engage other users in discussions relating to the video item.

Execution Environment

Figure 5:
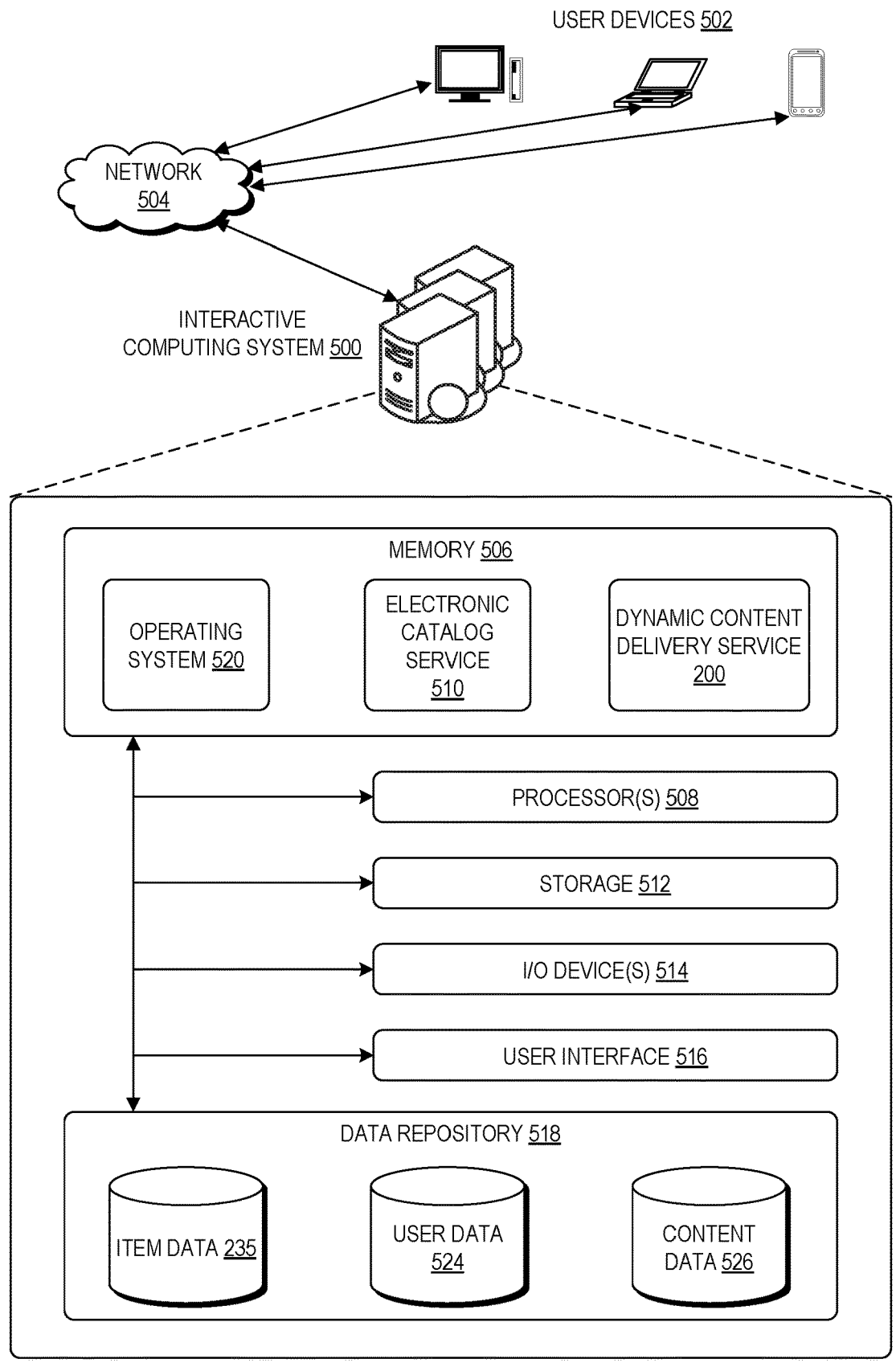
FIG. 5 is a block diagram of an illustrative computing system configured to implement the dynamic content delivery service of FIG. 2.

FIG. 5 is a block diagram of an illustrative interactive computing system 500 configured to implement a content delivery service as described above. The architecture of the interactive computing system 500 may include a memory 506 storing an operating system 520, an electronic catalog service 510, and dynamic content delivery service 200, which can be in direct communication with one another or distributed among computing devices within a networked computing system and in communication with each other. Components used for the architecture may depend at least in part upon the type of network and/or environment selected.

The interactive computing system 500 may include one or more computers, perhaps arranged in a cluster of servers or as a server farm. The memory and processors that make up these computers may be located within one computer or distributed throughout many computers (including computers that are remote from one another) as detailed herein. These servers may be configured to serve content and manage recommendations. For example, the interactive computing system 500 may be configured to manage recommendations offered via a content delivery service 200 in connection with an electronic marketplace 510.

The interactive computing system 500 may include at least one memory 506 and one or more processing units (or processor(s)) 508. The memory 506 may include more than one memory and may be distributed throughout the interactive computing system 500. The memory 506 may store program instructions that are loadable and executable on the processor(s) 508 as well as data generated during the execution of these programs. Depending on the configuration and type of memory, the memory 506 may be volatile (such as random access memory (RAM)) and/or non-volatile (such as read-only memory (ROM), flash memory, or other memory). In some examples, the memory 506 may include multiple different types of memory, such as static random access memory (SRAM), dynamic random access memory (DRAM), or ROM. The memory can store the program instructions as a number of modules that configure processor(s) 508 to perform the various functions described herein, for example operating system 520, electronic catalog service 510, and dynamic content delivery service 200.

The memory 506 may include operating system 520 for interacting with the interactive computing system 500. Interactive computing system 500 can host the interactive electronic catalog service 510 through which users can view and purchase, rent, stream, or otherwise acquire items (e.g., physical goods, digital media, and/or services). In some embodiments, user interactions with the electronic catalog service 510 can be used to populate user and/or video profiles.

As discussed above, the dynamic content delivery service 200 is configured to serve content to socially-connected groups of users, where the content and user groupings are updated dynamically based on real-time analysis of user behaviors to identify triggers.

The processor 508 may include one or more general purpose computers, dedicated microprocessors, graphics processors, or other processing devices capable of communicating electronic information. Examples of the processor 508 include one or more application-specific integrated circuits (ASICs), graphical processing units (GPUs), field programmable gate arrays (FPGAs), digital signal processors (DSPs) and any other suitable specific or general purpose processors. The processor 508 may be implemented as appropriate in hardware, firmware, or combinations thereof with computer-executable instructions and/or software. Computer-executable instructions and software may include computer-executable or machine-executable instructions written in any suitable programming language to perform the various functions described.

In some examples, the interactive computing system 500 may also include additional storage 512, which may include removable storage and/or non-removable storage. The additional storage 512 may include, but is not limited to, magnetic storage, optical disks, and/or tape storage. The disk drives and their associated computer-readable media may provide non-volatile storage of computer-readable instructions, data structures, program modules, and other data for the computing devices. The memory 506 and the additional storage 512, both removable and non-removable, are examples of computer-readable storage media. For example, computer-readable storage media may include volatile or non-volatile, removable, or non-removable media implemented in any suitable method or technology for storage of information such as computer-readable instructions, data structures, program modules, or other data. As used herein, modules, engines, and components, may refer to programming modules executed by computing systems (e.g., processors) that are part of the architecture. The interactive computing system 500 may also include input/output (I/O) device(s) and/or ports 514, such as for enabling connection with a keyboard, a mouse, a pen, a voice input device, a touch input device, a display, speakers, a printer, or other I/O device.

The interactive computing system 500 may also include a user interface 516. The user interface 516 may be utilized by a user to access portions of the interactive computing system 500. In some examples, the user interface 516 may include a graphical user interface, web-based applications, programmatic interfaces such as application programming interfaces (APIs), or other user interface configurations. The user interface 516 can include displays of the recommendations described herein.

The interactive computing system 500 may also include a data store 518. In some examples, the data store 518 may include one or more data stores, databases, data structures, or the like for storing and/or retaining information associated with the interactive computing system 500. Thus, the data store 518 may include data structures, such as item data repository 235, user data repository 524, and content data repository 526. User data repository 524 can include user profiles data repository 205, user groupings data repository 225, and other user data repositories relating to users of the electronic catalog service. Content data repository 526 can include video profiles data repository 210 and available video channels data repository 240.

The item data repository 235 may be used to retain information about items available within the electronic catalog service 510. As described above, items can include physical and/or digital products available for acquisition in an electronic marketplace. In other embodiments items can include advertisements, web pages, and other digital content. The item data repository 235 may be updated as the selection of available items changes over time.

The interactive computing system 500 can communicate over network 504 with user devices 502. The network 504 can include any appropriate network, including an intranet, the Internet, a cellular network, a local area network or any other such network or combination thereof. For example, network 504 may be a publicly accessible network of linked networks, possibly operated by various distinct parties, such as the Internet. In other embodiments, the network 504 may include a private network, personal area network, local area network, wide area network, cable network, satellite network, cellular telephone network, etc. or a combination thereof, some or all of which may or may not have access to and/or from the Internet. User devices 502 can include any network-equipped computing device, for example desktop computers, laptops, smartphones, tablets, e-readers, gaming consoles, and the like. Users can access the interactive computing system 500 and interact with the electronic catalog service 510 and/or the dynamic content delivery service 200 via the network 504 and can be provided with content and/or recommendations via the network 504.

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multithreaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the scope of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system comprising:
a computer-readable memory storing executable instructions; and
one or more computing devices in communication with the computer-readable memory, the one or more computing devices programmed by the executable instructions to at least:
identify a plurality of users accessing a video delivery system;
create a plurality of groups, each of the plurality of groups including a different subset of the plurality of users;
for each group of the plurality of groups, identify a video to output for playback to users in the group;
for a first group of the plurality of groups, output a first video for playback to each user in the first group such that the users in the first group are presented with playback of the first video in synchronization;
initialize a messaging system to socially connect the users in the first group, wherein the messaging system is configured to enable the users in the first group to share reactions to the first video with each other;
monitor the reactions in real time to detect a redirection trigger;
upon detecting the redirection trigger, identify a first subset of users in at least the first group who provided reactions associated with the redirection trigger;
identify a new video to output for playback to the first subset of users based at least partly on the provided reactions associated with the trigger; and
redirect the first subset of users to playback of the new video such that the messaging system enables the first subset of users to share new reactions to the new video with each other, wherein the new reactions are not shared with at least a second subset of users in the first group who are not redirected to the new video.

2. The system of claim 1, wherein, to identify the new video, the one or more computing devices are programmed by the executable instructions to at least:
access user profile data specifying attributes of the first subset of users;
access video profile data specifying attributes of the new video; and
determine that one or more of the attributes of the first subset of users correlate with one or more of the attributes of the new video.

3. The system of claim 2, wherein, to identify the new video, the one or more computing devices are programmed by the executable instructions to at least:
estimate a mood of the first subset of users based on the provided reactions; and
determine that the mood of the first subset of users correlates with one or more attributes of the new video.

4. The system of claim 1, wherein, to redirect the first subset of users, the one or more computing devices are programmed by the executable instructions to at least merge the first subset of users with a different group of the plurality of groups, wherein the different group of the plurality of groups is viewing the new video.

5. The system of claim 4, wherein, to merge the first subset of users with the different group, the one or more computing devices are programmed by the executable instructions to at least jump the first subset of users into the new video at a current time code at which the different group is viewing the new video.

6. A computer-implemented method comprising, as performed by at least one computing device configured to execute specific instructions:
identifying a plurality of users accessing a content delivery system;
creating a plurality of groups, each of the plurality of groups including a different subset of the plurality of users;
for each group of the plurality of groups, identifying a digital content item to output for presentation to users in the group;
for a first group of the plurality of groups, initializing a messaging system configured to enable the users in the first group to share, with other users in the first group, reactions to a first digital content item output for presentation to users in the first group;
monitoring the reactions in real time to detect a trigger;
upon detecting the trigger, identifying a first subset of users in at least the first group who provided reactions associated with the trigger;
identifying a new digital content item to present to the first subset of users based at least partly on the provided reactions associated with the trigger; and
outputting the new digital content item for presentation to the first subset of users, such that the messaging system enables the first subset of users to share new reactions to the new digital content item with each other, wherein the new reactions are not shared with at least a second subset of users in the first group who are not presented with the new digital content item.

7. The computer-implemented method of claim 6, wherein the new digital content item comprises a video in a video channel, wherein a plurality of videos in the video channel share common attributes, the method further comprising:
assigning the first subset of users to a new group; and
assigning the new group to the video channel.

8. The computer-implemented method of claim 7, further comprising:
accessing user profile data specifying attributes of the first subset of users; and
assigning the new group to the video channel based additionally on a determination that one or more of the attributes of the first subset of users correlate with one or more of the common attributes of the plurality of videos in the video channel.

9. The computer-implemented method of claim 6, further comprising:
detecting a plurality of triggers; and
regrouping users of the plurality of users who provided reactions corresponding to the triggers.

10. The computer-implemented method of claim 9, wherein regrouping the users comprises maintaining a minimum, maximum, or set number of users in each of the plurality of groups.

11. The computer-implemented method of claim 9, wherein regrouping the users comprises creating a new group by merging users from at least two of the plurality of groups.

12. The computer-implemented method of claim 9, wherein regrouping the users comprises:
   analyzing profiles associated with the users to identify attributes of the users; and
   regrouping the users such that the users are assigned to groups with other users having one or more similar attributes.

13. The computer-implemented method of claim 12, further comprising identifying new digital content items to output for presentation to each of the groups based on the one or more similar attributes of users in the groups.

14. A non-transitory computer storage medium storing executable code, wherein the executable code configures a computing system to perform a process comprising:
   monitoring a plurality of groups of users accessing a content delivery system, wherein users in each group are presented with digital content items and are presented with user-selectable options to provide reactions to the digital content items, wherein reactions provided in an individual group are shared with other users in the individual group;
   monitoring the reactions to detect a trigger;
   upon detecting the trigger, identifying at least one user in a first group who provided a reaction associated with the trigger;
   identifying a new digital content item to output for presentation to the at least one user based at least partly on the provided reaction associated with the trigger; and
   outputting the new digital content item for presentation to the at least one user wherein the at least one user is presented with an option to share a new reaction to the new digital content item with other users who are presented with the new digital content item, wherein at least a subset of users in the first group are not presented with the new digital content item.

15. The non-transitory computer storage medium of claim 14, wherein the executable code configures the computing system to detect the trigger based on the reaction exceeding a negative reaction threshold.

16. The non-transitory computer storage medium of claim 14, wherein the executable code configures the computing system to detect the trigger based on a threshold number or percentage of users in a group providing negative reactions to a digital content item currently output for presentation to the group.

17. The non-transitory computer storage medium of claim 14, the process further comprising:
   detecting a plurality of triggers; and
   regrouping users of the plurality of users who provided reactions corresponding to the plurality of triggers.

18. The non-transitory computer storage medium of claim 17, wherein the executable code configures the computing system to regroup the users based on maintaining a minimum, maximum, or set number of users per group.

19. The non-transitory computer storage medium of claim 17, wherein regrouping the users comprises changing a number of the plurality of groups by at least one of splitting groups, merging groups, or creating new groups.

20. The non-transitory computer storage medium of claim 17, wherein regrouping the users comprises:
   analyzing profiles associated with the users to identify attributes of the users;
   regrouping the users such that the users are assigned to groups with other users having one or more similar attributes; and
   identifying one or more new digital content items to output for presentation to an individual group based on one or more similar attributes of users in the individual group.

* * * * *